(12) United States Patent
Rath et al.

(10) Patent No.: US 12,078,731 B2
(45) Date of Patent: Sep. 3, 2024

(54) DETERMINING OUTAGES OF A SATELLITE NAVIGATION SYSTEM AND SIGNAL INTERFERENCE

(71) Applicant: The Boeing Company, Chicago, IL (US)

(72) Inventors: Sabine Rath, Zwingenberg (DE); Andreas Sindlinger, Weinheim (DE); Ralf Rene Cabos, Hainburg (DE)

(73) Assignee: The Boeing Company, Chicago, IL (US)

(*) Notice: Subject to any disclaimer, the term of this patent is extended or adjusted under 35 U.S.C. 154(b) by 9 days.

(21) Appl. No.: 17/733,333

(22) Filed: Apr. 29, 2022

(65) Prior Publication Data
US 2023/0350074 A1 Nov. 2, 2023

(51) Int. Cl.
*G01S 19/21* (2010.01)
*G01S 19/14* (2010.01)
*G01S 19/42* (2010.01)
*G08G 5/00* (2006.01)

(52) U.S. Cl.
CPC ............. *G01S 19/21* (2013.01); *G01S 19/14* (2013.01); *G01S 19/215* (2013.01); *G01S 19/42* (2013.01); *G08G 5/0021* (2013.01); *G08G 5/0047* (2013.01)

(58) Field of Classification Search
CPC ........ G01S 19/21; G01S 19/14; G01S 19/215; G01S 19/42; G08G 5/0021; G08G 5/0047
USPC .......................... 342/357.59, 357.52, 357.25
See application file for complete search history.

(56) References Cited

U.S. PATENT DOCUMENTS

| | | | | |
|---|---|---|---|---|
| 8,760,319 | B2* | 6/2014 | Kommuri | G08G 5/0021 701/14 |
| 9,583,005 | B2* | 2/2017 | Kommuri | G08G 5/0021 |
| 10,082,580 | B2* | 9/2018 | Ben-Moshe | H04K 3/90 |
| 10,137,863 | B2* | 11/2018 | Johnson | H04K 3/65 |
| 10,457,249 | B2* | 10/2019 | Johnson | H04K 3/255 |
| 10,746,880 | B2* | 8/2020 | Ben-Moshe | G01S 19/21 |

(Continued)

FOREIGN PATENT DOCUMENTS

| | | | | |
|---|---|---|---|---|
| CN | 113568010 A | * | 10/2021 | ............. G01S 19/37 |
| CN | 113759392 A | * | 12/2021 | ............. G01S 19/13 |

(Continued)

*Primary Examiner* — Chuong P Nguyen
(74) *Attorney, Agent, or Firm* — Quinn IP Law

(57) ABSTRACT

A method of supporting flight operations of aircraft includes accessing a data stream of geographic positions of aircraft on respective flights. The geographic positions are determined using a satellite navigation system and obtained from automatic dependent surveillance broadcast (ADS-B) position reports, or estimated independent of the ADS-B position reports. The geographic positions are tracked to determine a number of the respective flights for which the geographic positions change from being obtained from the ADS-B position reports, to being estimated independent of the ADS-B position reports. The method includes determining an outage in which the satellite navigation system is unavailable to the aircraft, based on the number of the respective flights for which the geographic positions change from the ADS-B position reports to estimated independent of the ADS-B position reports, and based on a threshold. And an outage notification is generated that is output to alert users of the outage.

20 Claims, 9 Drawing Sheets

(56) References Cited

U.S. PATENT DOCUMENTS

| | | | |
|---|---|---|---|
| 11,546,875 B2* | 1/2023 | Campbell | ........... H04M 15/856 |
| 2020/0158885 A1 | 5/2020 | Chen | |
| 2022/0003880 A1 | 1/2022 | Valtersson | |
| 2023/0204789 A1* | 6/2023 | Kazmierczak | ....... G08G 5/0078 |
| | | | 342/357.59 |

FOREIGN PATENT DOCUMENTS

| | | | | |
|---|---|---|---|---|
| CN | 114550504 A | * | 5/2022 | ........... G08G 5/0073 |
| EP | 2161542 A1 | | 3/2010 | |
| GB | 2598971 A | * | 3/2022 | ........... G08G 5/0013 |

\* cited by examiner

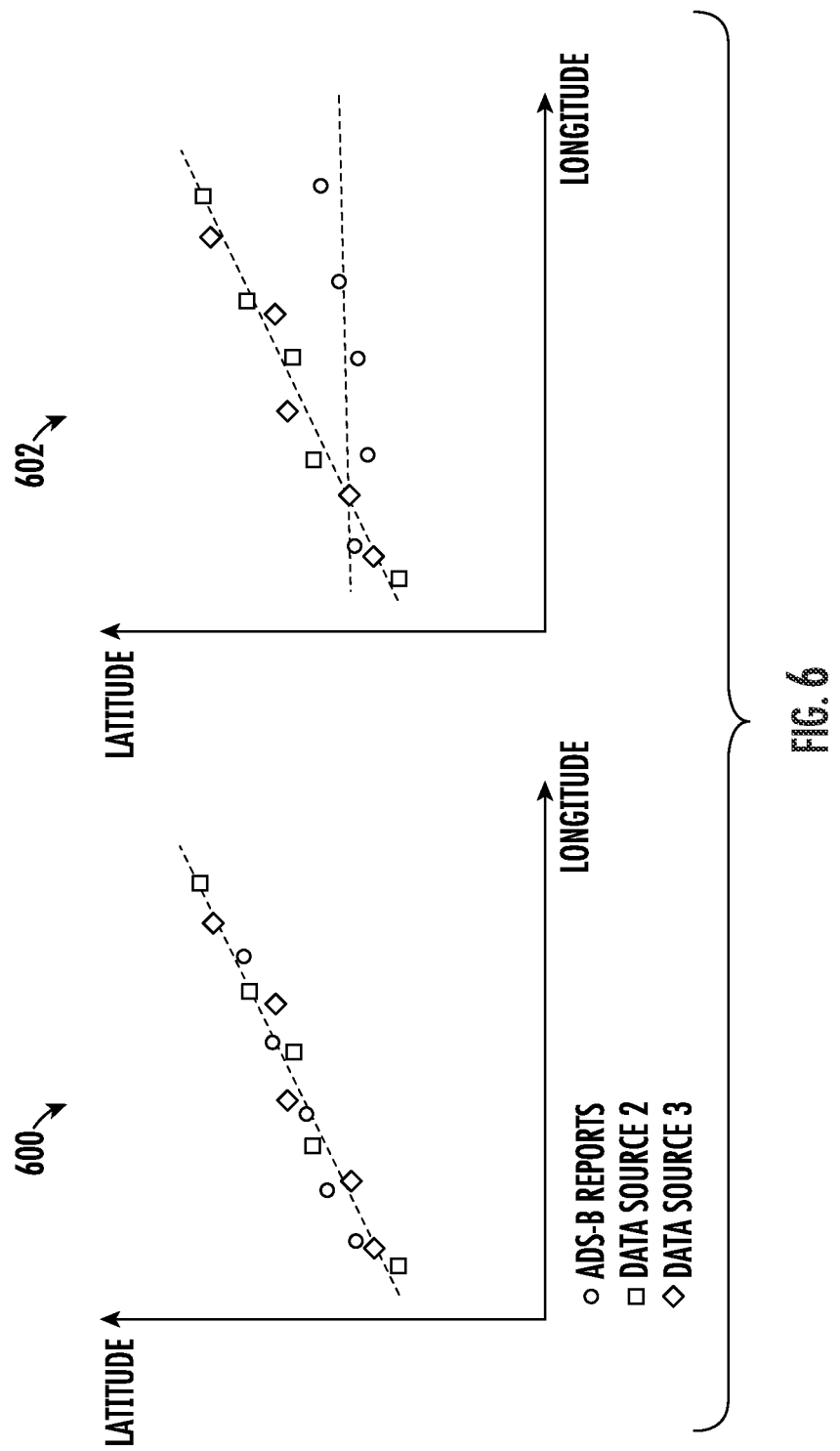

DETERMINING OUTAGES OF A SATELLITE NAVIGATION SYSTEM AND SIGNAL INTERFERENCE

TECHNOLOGICAL FIELD

The present disclosure relates generally to aircraft operations and, in particular, to determining outages in which a satellite navigation system is unavailable to aircraft.

BACKGROUND

Aircraft nowadays commonly utilize satellite navigation systems such as the Global Positioning System (GPS) as a means of navigation. While GPS and similar satellite navigation systems are freely and globally available, conditions of the satellite navigation system or environment of the aircraft may prevent aircraft from receiving adequate signals from satellites of the satellite navigation system. This may be due to a number of different factors, such as militaries that may locally jam signals for security purposes, or interference in the environment that may impact signals.

Conditions that prevent aircraft from receiving adequate signals from the satellite navigation system may impact avionics onboard the aircraft. This may include, in particular, incorrect timestamps and dates for systems deriving data points from satellite navigation. It would therefore be desirable to have a system and method that takes into account at least some of the issues discussed above, as well as other possible issues.

BRIEF SUMMARY

Example implementations of the present disclosure are directed aircraft operations and, in particular, to determining outages in which a satellite navigation system such as GPS is unavailable to aircraft. Some example implementations detect these outages using automatic dependent surveillance broadcast (ADS-B) position reports. In some example implementations, an airspace may be divided into geographic areas, outages for any of the geographic areas may be determined by monitoring geographic positions of aircraft in those geographic areas, which may be obtained from ADS-B position reports, or estimated independent of ADS-B positions reports. Some examples may further compare different sourced geographic positions to determine signal interference in the satellite navigation system.

The present disclosure thus includes, without limitation, the following example implementations.

Some example implementations provide an apparatus for supporting flight operations of aircraft, the apparatus comprising: a memory configured to store computer-readable program code; and processing circuitry configured to access the memory, and execute the computer-readable program code to cause the apparatus to at least: access a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system; track the geographic positions of the aircraft to determine a number of the respective flights for which the geographic positions change from being obtained from the ADS-B position reports, to being estimated independent of the ADS-B position reports; determine an outage in which the satellite navigation system is unavailable to the aircraft, based on the number of the respective flights for which the geographic positions change from the ADS-B position reports to estimated independent of the ADS-B position reports, and based on a threshold; and generate an outage notification that is output to alert users of the outage.

Some example implementations provide a method of supporting flight operations of aircraft, the method comprising: accessing a data stream of geographic positions of aircraft on respective flights, the geographic positions obtained from ADS-B position reports, or estimated independent of the ADS-B position reports, those of the geographic positions obtained from the ADS-B position reports determined using a satellite navigation system; tracking the geographic positions of the aircraft to determine a number of the respective flights for which the geographic positions change from being obtained from the ADS-B position reports, to being estimated independent of the ADS-B position reports; determining an outage in which the satellite navigation system is unavailable to the aircraft, based on the number of the respective flights for which the geographic positions change from the ADS-B position reports to estimated independent of the ADS-B position reports, and based on a threshold; and generating an outage notification that is output to alert users of the outage.

Some example implementations provide a computer-readable storage medium for supporting flight operations of aircraft, the computer-readable storage medium being non-transitory and having computer-readable program code stored therein that, in response to execution by processing circuitry, causes an apparatus to at least: access a data stream of geographic positions of aircraft on respective flights, the geographic positions obtained from ADS-B position reports, or estimated independent of the ADS-B position reports, those of the geographic positions obtained from the ADS-B position reports determined using a satellite navigation system; track the geographic positions of the aircraft to determine a number of the respective flights for which the geographic positions change from being obtained from the ADS-B position reports, to being estimated independent of the ADS-B position reports; determine an outage in which the satellite navigation system is unavailable to the aircraft, based on the number of the respective flights for which the geographic positions change from the ADS-B position reports to estimated independent of the ADS-B position reports, and based on a threshold; and generate an outage notification that is output to alert users of the outage.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 7A:
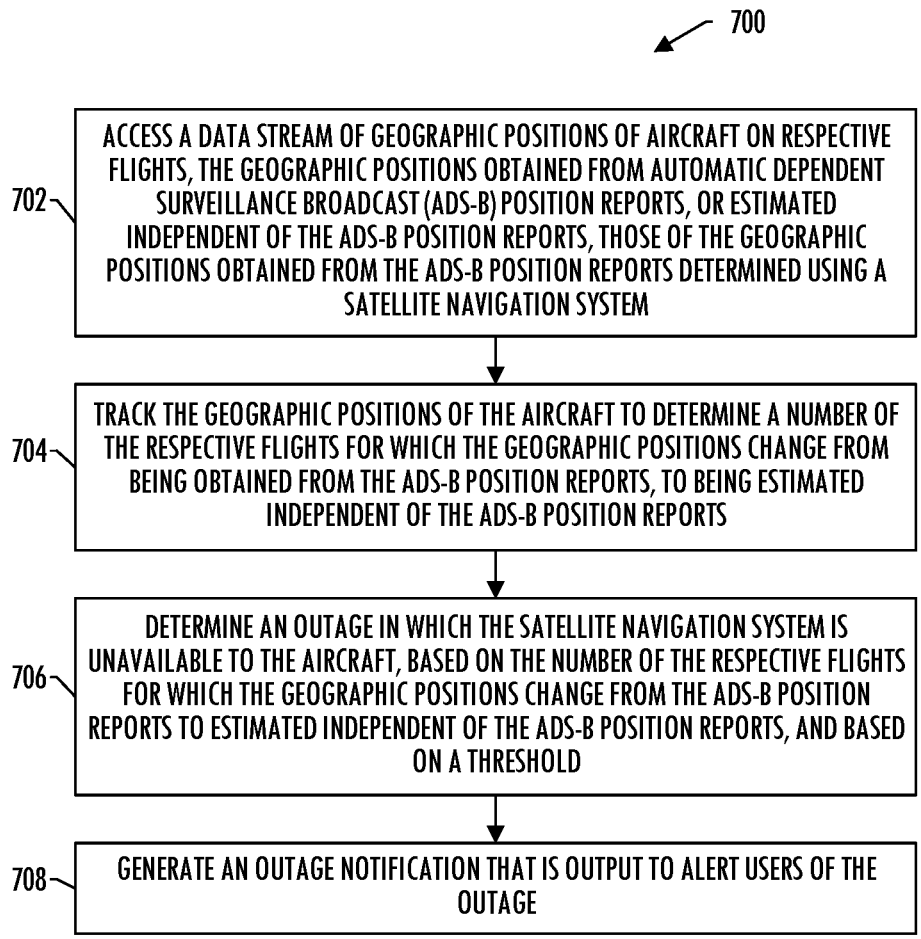
Figure 7B:
Figure 7C:
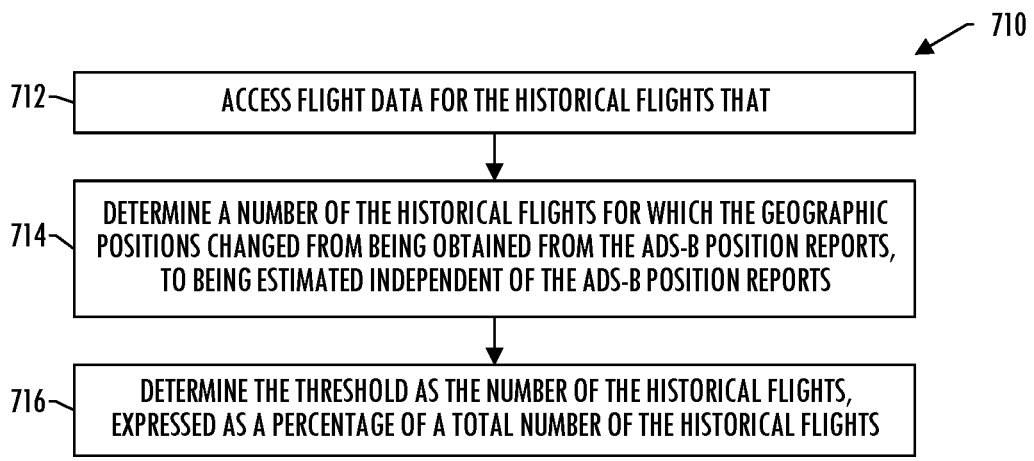
Figure 7D:
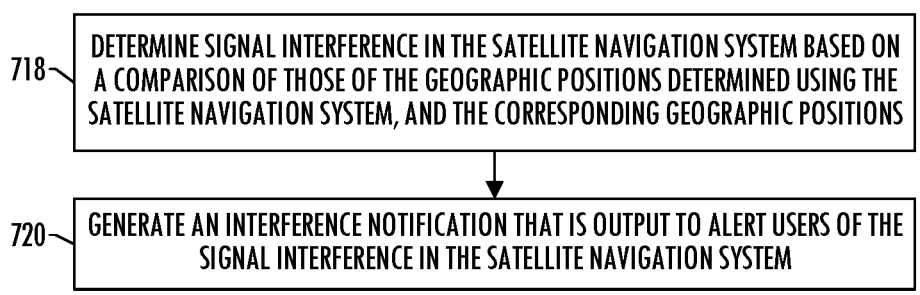
Figure 8:
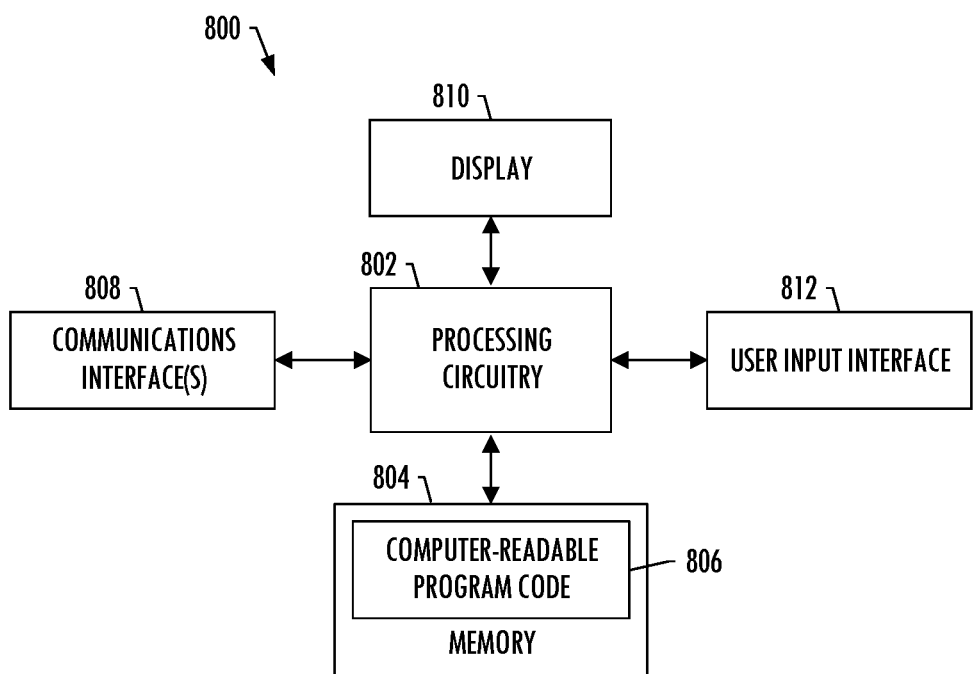

FIG. 6 includes graphs that illustrate comparisons between various geographic positions, according to some example implementations;

FIGS. 7A, 7B, 7C and 7D are flowcharts illustrating various steps in a method of supporting flight operations of aircraft, according to example implementations; and FIG. 8 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

Figure 1:
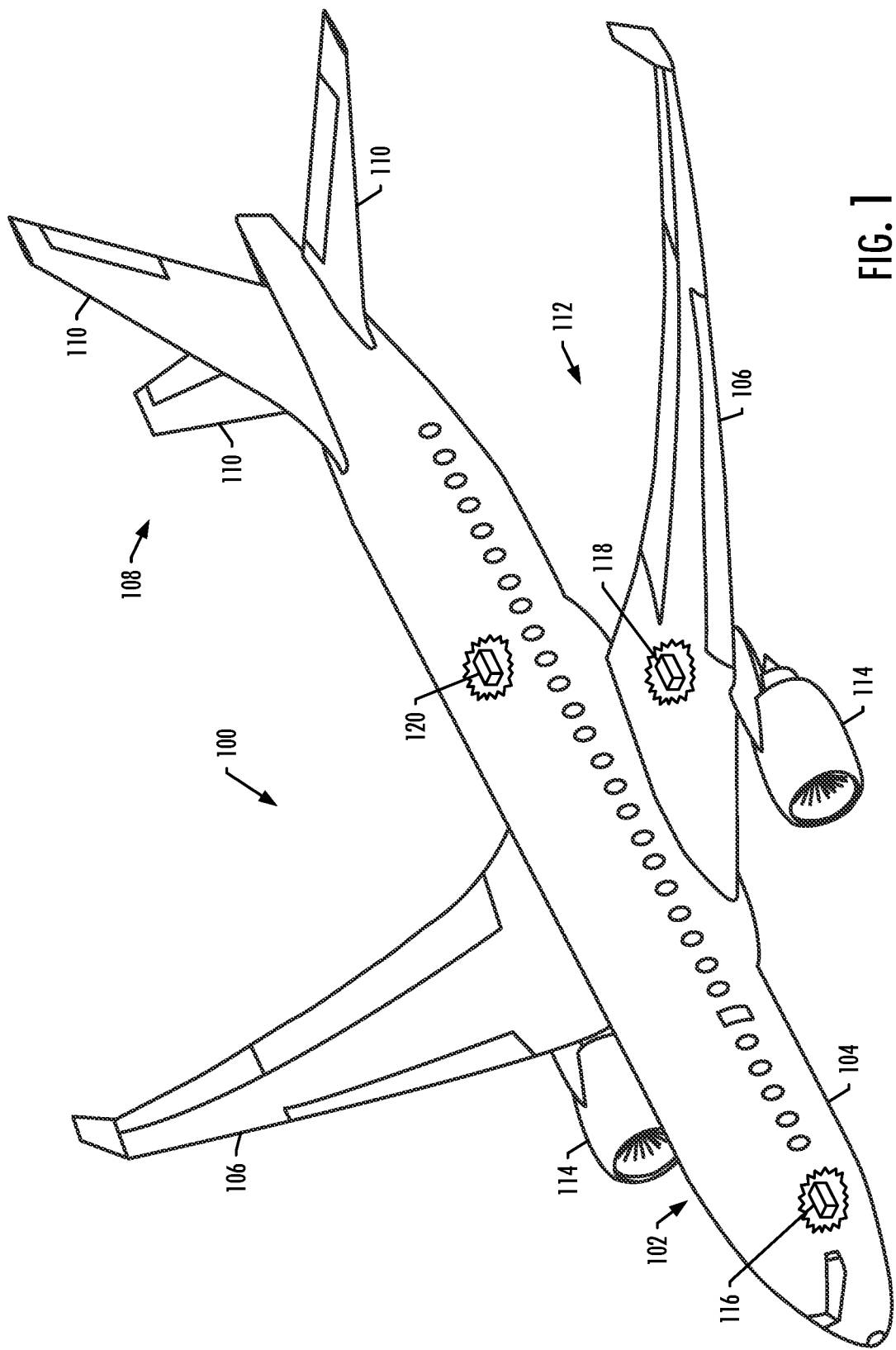
FIG. 1 illustrates one type of vehicle, namely, an aircraft that may benefit from example implementations of the present disclosure.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

Figure 2:
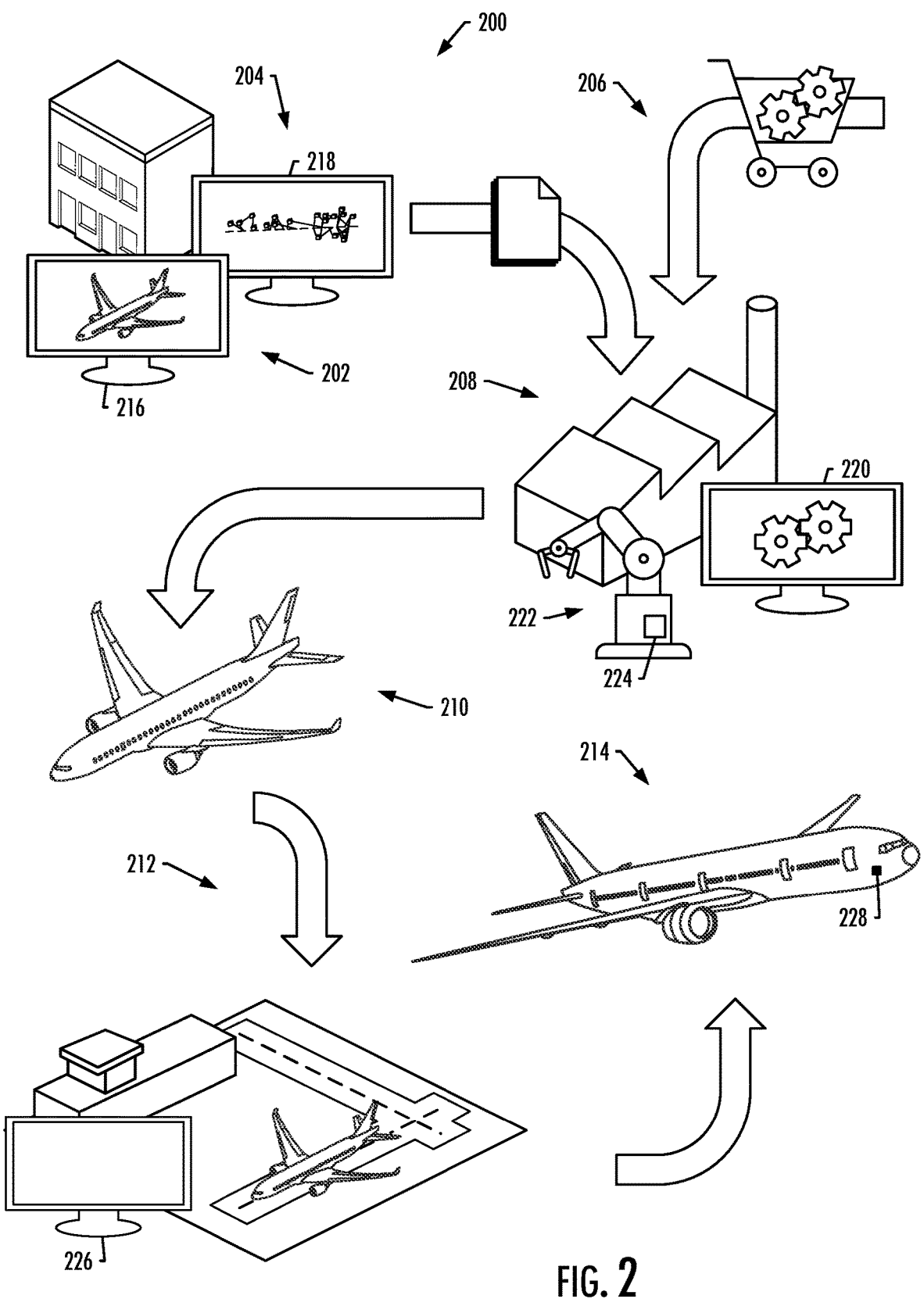
FIG. 2 illustrates an aircraft manufacturing and service method, according to some example implementations.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216, 218, 220, 224, 226, 228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Figure 3:
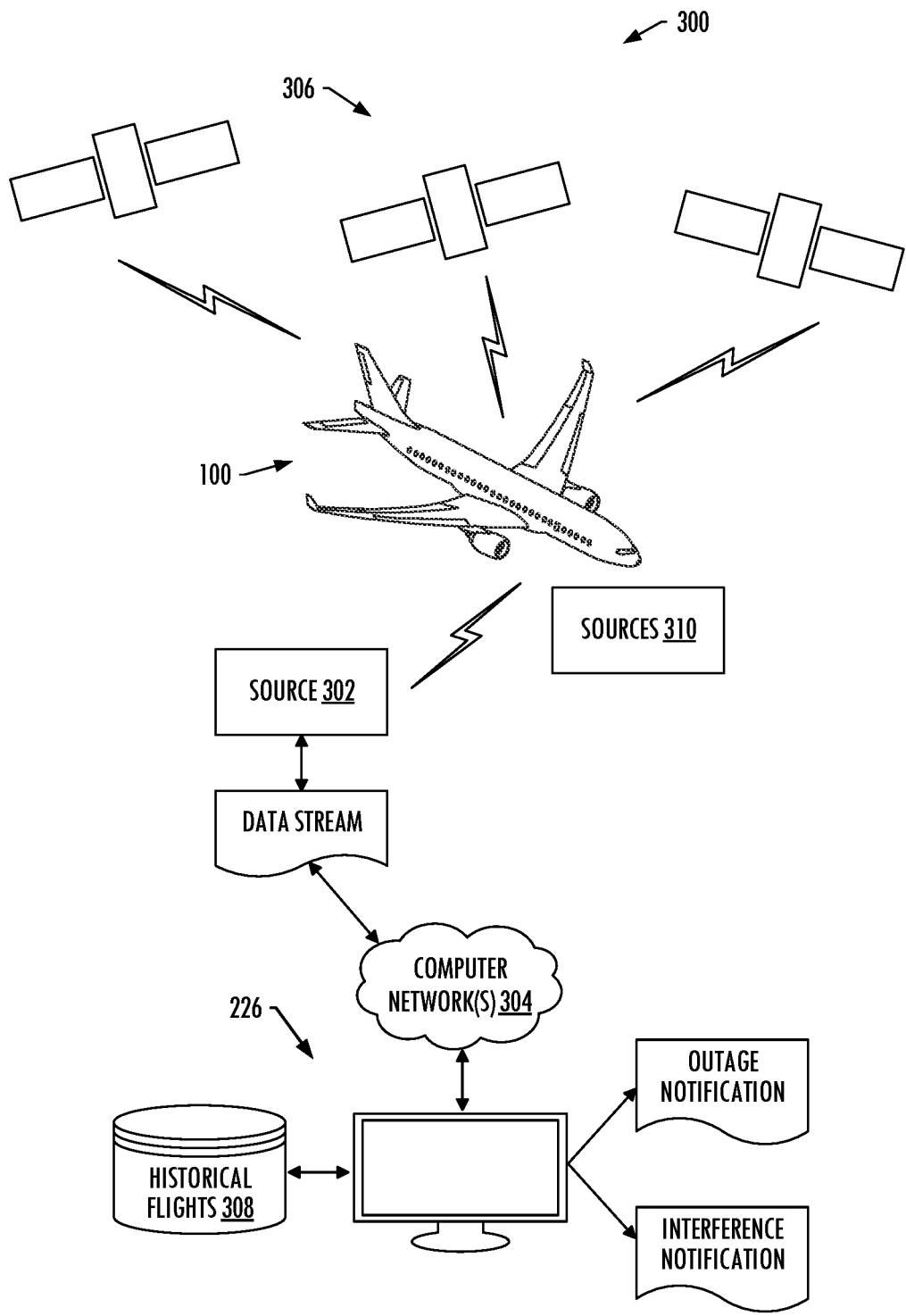
FIG. 3 illustrates a system for supporting flight operations of aircraft, according to some example implementations.

Example implementations of the present disclosure may be implemented throughout the aircraft manufacturing and service method 200, but are particularly well suited for implementation during in-service. In this regard, FIG. 3 illustrates a system 300 for supporting flight operations of aircraft 100 (single or multiple aircraft), according to some example implementations. As shown, the system includes a computer such as computer 226 that is configured to access a data stream of geographic positions of aircraft on respective flights. The computer is configured to access the data stream in a number of different manners, such as from at least one source 302 of data. The source may be separate from or integrated with the computer, and in some examples, the source and the computer may communicate with one another across one or more computer networks 304. In a more particular example, the source may be a service provider such as Flightradar24.

According to example implementations, the geographic positions in the data stream are obtained from automatic dependent surveillance broadcast (ADS-B) position reports, or estimated independent of the ADS-B position reports. In various examples, the ADS-B position reports may be received by the source 302 from the aircraft 100, and the source may be configured to itself determine any of the geographic positions that are estimated independent of the ADS-B position reports.

As is known, ADS-B is a surveillance technology for tracking aircraft 100 that uses satellite-based navigation technology and a broadcast communications data-link. An aircraft that is an ADS-B capable aircraft may use a satellite navigation receiver to derive its precise geographic position from satellites of a satellite navigation system 306, and combine that geographic position with state information such as altitude, track, speed and flight number. Examples of suitable satellite navigation systems include Global Navigation Satellite Systems (GNSS) such as the Global Positioning System (GPS) including Wide Area Augmentation System (WAAS), Galileo, GLONASS, and BeiDu. The aircraft may include an ADS-B receiver to receive ADS-B position reports such as from other aircraft, and communicate those ADS-B reports to other aircraft, ground stations and the like. And in this regard, the source 302 may receive ADS-B position reports that are then accessed from the data stream by the computer 226.

In some situations, one or more aircraft 100 may fail to provide an ADS-B position report for at least some portion of a flight. In some of these situations, the failure may be due to a fault or failure of the satellite navigation receiver or ADS-B receiver onboard the aircraft. In other situations, the failure may be due to conditions of the satellite navigation system 306 or the environment of the aircraft that prevent the satellite navigation receiver from receiving adequate signals from the satellites of the satellite navigation system. In these other situations, the satellite navigation system 306 is unavailable to the aircraft. A fault or failure onboard a single aircraft may only impact that aircraft, whereas conditions of the satellite navigation system or the environment of the aircraft are likely to impact multiple aircraft.

When an aircraft 100 fails to provide an ADS-B position report with its geographic position, the source 302 may be configured to estimate the geographic position independent of an ADS-B position report. The source may be configured to estimate the geographic position in a number of different manners, such as from geographic positions of the aircraft from earlier ADS-B position reports on the same flight, calculation based on a planned route and time of departure, and the like. The geographic position as estimated may then be accessed from the data stream by the computer 226.

Figure 4A:
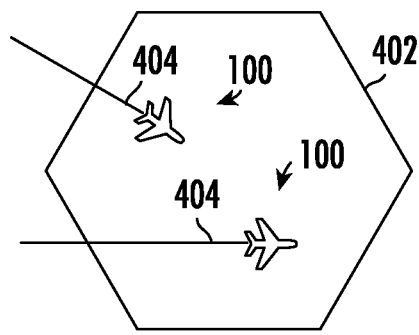
FIGS. 4A, 4B and 4C illustrate three distinct situations of aircraft flying through an arbitrary geographical area, according to some example implementations.
Figure 4B:
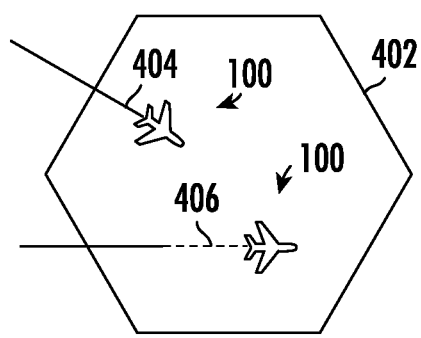
Figure 4C:
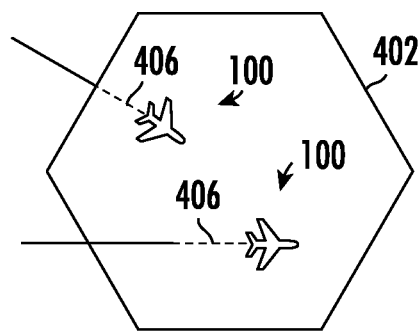

FIGS. 4A, 4B and 4C illustrate three distinct situations 400A, 400B, 400C of aircraft 100 flying through an arbitrary geographical area 402, according to some example implementations. As shown in FIG. 4A, in a first situation 400A, the geographic positions 404 of the aircraft are obtained from ADS-B reports. In a second situation 400B, as shown in FIG. 4B, the geographic positions 406 one or more of the aircraft are estimated independent of ADS-B reports, which may be due to a fault or failure of the satellite navigation receiver or ADS-B receiver onboard the respective aircraft. In a third situation 400C, as shown in FIG. 4C, the geographic positions 406 of multiple of the aircraft are estimated independent of ADS-B reports. As indicated above, this may be due to conditions of the satellite navigation system 306 or the environment of the aircraft that prevent the satellite navigation receiver from receiving adequate signals from the satellites of the satellite navigation system.

The computer 226 is configured to track the geographic positions of the aircraft 100 to determine a number of the respective flights for which the geographic positions change from being obtained from the ADS-B position reports, to being estimated independent of the ADS-B position reports. The computer is configured to determine an outage in which the satellite navigation system 306 is unavailable to the aircraft 100, based on the number of the respective flights for which the geographic positions change from the ADS-B position reports to estimated independent of the ADS-B position reports, and based on a threshold. This may be the situation, for example, in the third situation 400C. And the computer is configured to generate an outage notification that is output to alert users of the outage.

In some examples, the flights of the aircraft 100 are in an airspace that is divided into geographic areas. In some of these examples, the outage is determined for a geographic area of the geographic areas based on those of the geographic positions within the geographic area that change from being obtained from the ADS-B position reports, to being estimated independent of the ADS-B position reports. And in some further examples, the outage is determined for multiple of the geographic areas based on those of the geographic positions within respective ones of the multiple geographic areas that change from being obtained from the ADS-B position reports, to being estimated independent of the ADS-B position reports.

Figure 5:
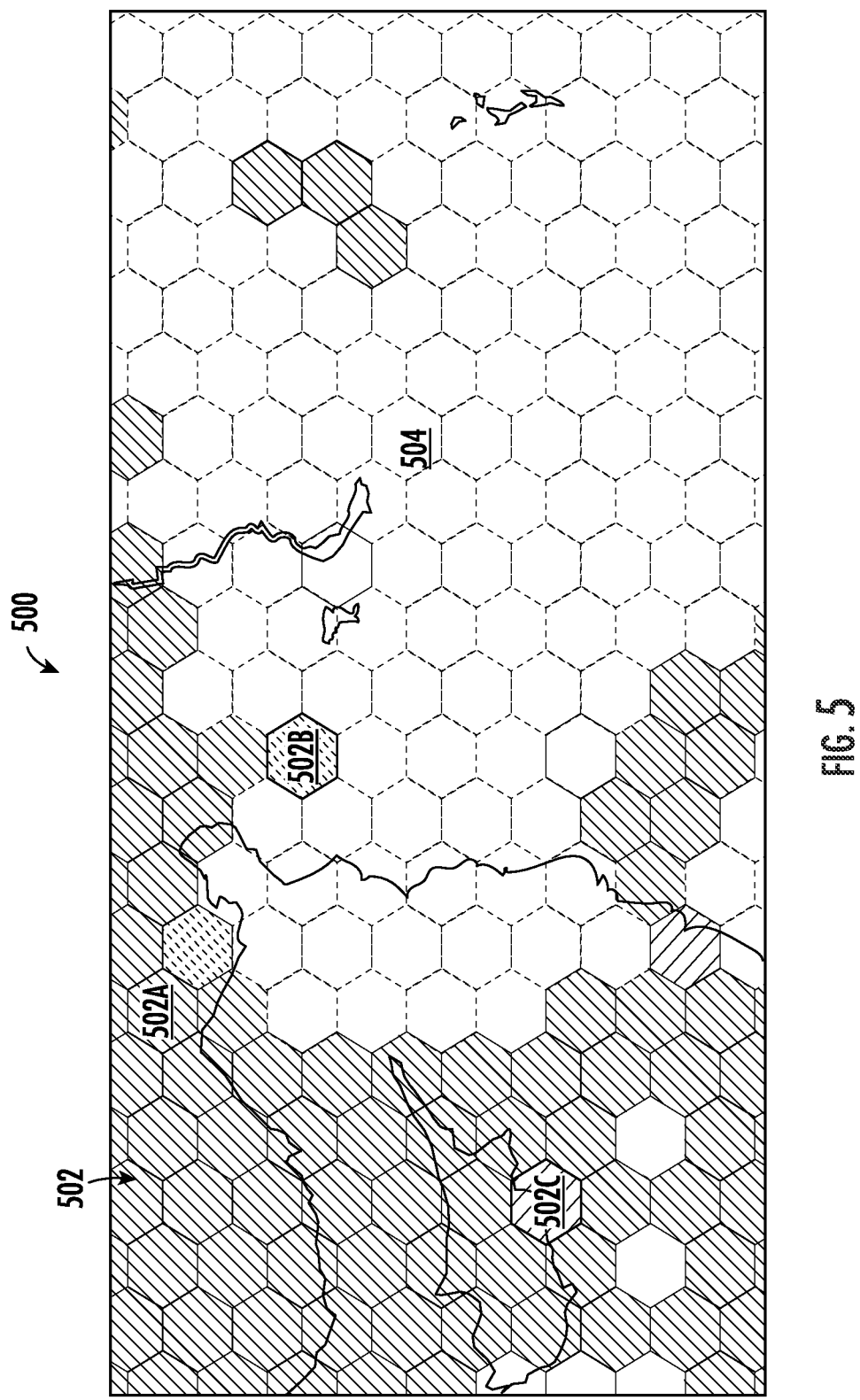
FIG. 5 illustrates a map of an airspace that may be divided into geographic areas that are monitored for outages, according to some example implementations.

FIG. 5 illustrates a map 500 of an airspace that may be divided into geographic areas 502 that are monitored for outages (one geographic area of which is specifically called out in the figure), according to some example implementations. The geographic areas may be color-coded 502A, 502B, 502C or otherwise marked to indicate different numbers of geographic positions within respective ones of the multiple geographic areas that change from being obtained from the ADS-B position reports, to being estimated independent of the ADS-B position reports. The map also indicates a portion 504 of the airspace may be undivided (or otherwise indicated only by faint boundaries) to indicate an absence of any ADS-B reports or any measurable number of ADS-B reports from aircraft 100 in that portion of the airspace.

The threshold may be determined, and used by the computer 226 to determine the outage, in any of a number of different manners. In some examples, the threshold is expressed as a threshold percentage (e.g., 15%), and the outage is determined when the number of the respective flights, expressed as a percentage of a total number of the respective flights, exceeds the threshold percentage.

The threshold may be determined or otherwise specific to a time interval. In some of these example, the data stream includes the geographic positions of the aircraft 100 within a time interval, and the computer 226 is further configured to determine the threshold for the time interval. In some more particular examples, the threshold is determined based on historical flights of aircraft 100 for an earlier time interval during which the satellite navigation system 306 was unavailable, which may be accessed from the source 302, a database of historical flights 308 or the like.

In some examples, determination of the threshold includes the computer 226 configured to access flight data for the historical flights that includes the geographic positions of the aircraft 100 on the historical flights. In these examples, the computer is configured to determine a number of the historical flights for which the geographic positions changed from being obtained from the ADS-B position reports, to being estimated independent of the ADS-B position reports. And the computer is configured to determine the threshold as the number of the historical flights, expressed as a percentage of a total number of the historical flights. This may be the same as or similar to the threshold percentage described above.

The threshold in some examples may be set as a certain percentage above the percentage of the number of historical flights for which the geographic positions changed form ADS-B to estimated. In a particular example, the percentage of the number of historical flights for which the geographic positions changed may be 5%, and the threshold may be set 15% above that percentage, i.e., the threshold may be set at 20%. A confidence value may also be considered based on a change in percentage (e.g., historic: 5%; raise to 15%→confidence 0.5; raise to 20%→confidence 0.7; raise to 30%→confidence 0.9; raise to 60%→confidence 1.0).

In addition to or in lieu of determining an outage, the computer 226 may be configured to determine signal interference in the satellite navigation system 306. In this regard, the data stream of some examples further includes corresponding geographic positions of the aircraft 100 obtained from data sources 310 distinct from the ADS-B position reports and the satellite navigation system 306. At least some of these data sources may be located onboard the aircraft, such as multiple ones of distance measuring equipment (DME), very high frequency omni-directional range (VOR), localizer (LOC), or inertial reference unit (IRU). Additionally or alternatively, at least some of the data sources may include data sources located on ground, such as multiple ones of multilateration (MLAT), wide area multilateration (WAM), primary radar, Mode S radar, FLARM, or Open Glider Network (OGN). In even further examples, one or more of the data sources may be located onboard the aircraft, and one or more of the data sources may be located on ground.

The computer 226 may be configured to determine signal interference in the satellite navigation system 306 based on a comparison of those of the geographic positions determined using the satellite navigation system 306, and the corresponding geographic positions of the aircraft 100 obtained from data sources 310. In this regard, the signal interference is determined when the geographic positions differ from the corresponding geographic positions by more than a difference threshold, such as a +−5 nautical mile (NM) offset. The computer 226 may then be configured to generate an interference notification that is output to alert users of the signal interference in the satellite navigation system.

FIG. 6 includes graphs 600, 602 that illustrate comparisons between various geographic positions, according to some example implementations. That is, the graphs illustrate comparisons between geographic positions (identified by latitude and longitude) determined using the satellite navigation system (ABS-D reports), and corresponding geographic positions obtained from two additional data sources (data source 2, data source 3). In this regard, graph 600 illustrates the case when the geographic positions differ from the corresponding geographic positions by less than a difference threshold. And graph 602 illustrates the case when the geographic positions differ from the corresponding geographic positions by more than a difference threshold, and that thereby indicate signal interference.

FIGS. 7A-7D are flowcharts illustrating various steps in a method 700 of supporting flight operations of aircraft, according to various example implementations of the present disclosure. The method includes accessing a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system, as shown at block 702 of FIG. 7A. The method includes tracking the geographic positions of the aircraft to determine a number of the respective flights for which the geographic positions change from being obtained from the ADS-B position reports, to being estimated independent of the ADS-B position reports, as shown at block 704. The method includes determining an outage in which the satellite navigation system is unavailable to the aircraft, based on the number of the respective flights for which the geographic positions change from the ADS-B position reports to estimated independent of the ADS-B position reports, and based on a threshold, as shown at block 706. And the method includes generating an outage notification that is output to alert users of the outage, as shown at block 708.

In some examples, the flights of the aircraft are in an airspace that is divided into geographic areas. In some of these examples, the outage is determined at block 706 for a geographic area of the geographic areas based on those of the geographic positions within the geographic area that change from being obtained from the ADS-B position reports, to being estimated independent of the ADS-B position reports.

In some examples, the outage is determined at block 706 for multiple of the geographic areas based on those of the geographic positions within respective ones of the multiple geographic areas that change from being obtained from the ADS-B position reports, to being estimated independent of the ADS-B position reports.

In some examples, the threshold is expressed as a threshold percentage, and the outage is determined at block 706 when the number of the respective flights, expressed as a percentage of a total number of the respective flights, exceeds the threshold percentage.

In some examples, the data stream includes the geographic positions of the aircraft within a time interval. In some of these examples, the method further includes determining the threshold for the time interval, as shown at block 710 of FIG. 7B.

In some further examples, the threshold is determined at block 710 based on historical flights of aircraft for an earlier time interval during which the satellite navigation system was unavailable.

In some examples, determining the threshold at block 710 includes accessing flight data for the historical flights that includes the geographic positions of the aircraft on the historical flights, as shown at block 712 of FIG. 7C. The method includes determining a number of the historical flights for which the geographic positions changed from being obtained from the ADS-B position reports, to being estimated independent of the ADS-B position reports, as shown at block 714. And the method includes determining the threshold as the number of the historical flights, expressed as a percentage of a total number of the historical flights, as shown at block 716.

In some examples, the data stream further includes corresponding geographic positions of the aircraft obtained from data sources distinct from the ADS-B position reports and the satellite navigation system. The method further includes determining signal interference in the satellite navigation system based on a comparison of those of the geographic positions determined using the satellite navigation system, and the corresponding geographic positions, as shown at block 718 of FIG. 7D. And the method includes generating an interference notification that is output to alert users of the signal interference in the satellite navigation system, as shown at block 720.

In some examples, the signal interference is determined at block 718 when the geographic positions differ from the corresponding geographic positions by more than a difference threshold.

In some examples, the corresponding geographic positions are obtained from the data sources at least some of which are located onboard the aircraft.

In some examples, the corresponding geographic positions are obtained from the data sources that include multiple ones of distance measuring equipment (DME), very high frequency omni-directional range (VOR), localizer (LOC), or inertial reference unit (IRU).

In some examples, the corresponding geographic positions are obtained from the data sources at least some of which are located on ground.

In some examples, the corresponding geographic positions are obtained from the data sources that include multiple ones of multilateration (MLAT), wide area multilateration (WAM), primary radar, Mode S radar, FLARM, or Open Glider Network (OGN).

In some examples, the corresponding geographic positions are obtained from the data sources at least some of which are located onboard the aircraft, and at least some of which are located on ground.

According to example implementations of the present disclosure, the system 300 and its subsystems (including computer 226) may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 8 illustrates an apparatus 800 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for supporting flight operations of aircraft, the apparatus comprising: a memory configured to store computer-readable program code; and processing circuitry configured to access the memory, and execute the computer-readable program code to cause the apparatus to at least: access a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system; track the geographic positions of the aircraft to determine a number of the respective flights for which the geographic positions change from being obtained from the ADS-B position reports, to being estimated independent of the ADS-B position reports; determine an outage in which the satellite navigation system is unavailable to the aircraft, based on the number of the respective flights for which the geographic positions change from the ADS-B position reports to estimated independent of the ADS-B position reports, and based on a threshold; and generate an outage notification that is output to alert users of the outage.

Clause 2. The apparatus of clause 1, wherein the flights of the aircraft are in an airspace that is divided into geographic areas, and wherein the outage is determined for a geographic area of the geographic areas based on those of the geographic positions within the geographic area that change from being obtained from the ADS-B position reports, to being estimated independent of the ADS-B position reports.

Clause 3. The apparatus of clause 2, wherein the outage is determined for multiple of the geographic areas based on those of the geographic positions within respective ones of the multiple geographic areas that change from being obtained from the ADS-B position reports, to being estimated independent of the ADS-B position reports.

Clause 4. The apparatus of any of clauses 1 to 3, wherein the threshold is expressed as a threshold percentage, and the outage is determined when the number of the respective flights, expressed as a percentage of a total number of the respective flights, exceeds the threshold percentage.

Clause 5. The apparatus of any of clauses 1 to 4, wherein the data stream includes the geographic positions of the aircraft within a time interval, and the processing circuitry is configured to execute the computer-readable program code to cause the apparatus to further determine the threshold for the time interval.

Clause 6. The apparatus of clause 5, wherein the threshold is determined based on historical flights of aircraft for an earlier time interval during which the satellite navigation system was unavailable.

Clause 7. The apparatus of clause 6, wherein the apparatus caused to determine the threshold includes the apparatus caused to: access flight data for the historical flights that includes the geographic positions of the aircraft on the historical flights; determine a number of the historical flights for which the geographic positions changed from being obtained from the ADS-B position reports, to being estimated independent of the ADS-B position reports; and determine the threshold as the number of the historical flights, expressed as a percentage of a total number of the historical flights.

Clause 8. The apparatus of any of clauses 1 to 7, wherein the data stream further includes corresponding geographic positions of the aircraft obtained from data sources distinct from the ADS-B position reports and the satellite navigation system, and the processing circuitry is configured to execute the computer-readable program code to cause the apparatus to further at least: determine signal interference in the satellite navigation system based on a comparison of those of the geographic positions determined using the satellite navigation system, and the corresponding geographic positions; and generate an interference notification that is output to alert users of the signal interference in the satellite navigation system.

Clause 9. The apparatus of clause 8, wherein the signal interference is determined when the geographic positions differ from the corresponding geographic positions by more than a difference threshold.

Clause 10. The apparatus of clause 8 or clause 9, wherein the corresponding geographic positions are obtained from the data sources at least some of which are located onboard the aircraft.

Clause 11. The apparatus of clause 10, wherein the corresponding geographic positions are obtained from the data sources that include multiple ones of distance measuring equipment (DME), very high frequency omni-directional range (VOR), localizer (LOC), or inertial reference unit (IRU).

Clause 12. The apparatus of any of clauses 8 to 11, wherein the corresponding geographic positions are obtained from the data sources at least some of which are located on ground.

Clause 13. The apparatus of clause 12, wherein the corresponding geographic positions are obtained from the data sources that include multiple ones of multilateration (MLAT), wide area multilateration (WAM), primary radar, Mode S radar, FLARM, or Open Glider Network (OGN).

Clause 14. The apparatus of any of clauses 8 to 13, wherein the corresponding geographic positions are obtained from the data sources at least some of which are located onboard the aircraft, and at least some of which are located on ground.

Clause 15. A method of supporting flight operations of aircraft, the method comprising: accessing a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system; tracking the geographic positions of the aircraft to determine a number of the respective flights for which the geographic positions change from being obtained from the ADS-B position reports, to being estimated independent of the ADS-B position reports; determining an outage in which the satellite navigation system is unavailable to the aircraft, based on the number of the respective flights for which the geographic positions change from the ADS-B position reports to estimated independent of the ADS-B position reports, and based on a threshold; and generating an outage notification that is output to alert users of the outage.

Clause 16. The method of clause 15, wherein the flights of the aircraft are in an airspace that is divided into geographic areas, and wherein the outage is determined for a geographic area of the geographic areas based on those of the geographic positions within the geographic area that change from being obtained from the ADS-B position reports, to being estimated independent of the ADS-B position reports.

Clause 17. The method of clause 16, wherein the outage is determined for multiple of the geographic areas based on those of the geographic positions within respective ones of the multiple geographic areas that change from being obtained from the ADS-B position reports, to being estimated independent of the ADS-B position reports.

Clause 18. The method of any of clauses 15 to 17, wherein the threshold is expressed as a threshold percentage, and the outage is determined when the number of the respective flights, expressed as a percentage of a total number of the respective flights, exceeds the threshold percentage.

Clause 19. The method of any of clauses 15 to 18, wherein the data stream includes the geographic positions of the aircraft within a time interval, and the method further comprises determining the threshold for the time interval.

Clause 20. The method of clause 19, wherein the threshold is determined based on historical flights of aircraft for an earlier time interval during which the satellite navigation system was unavailable.

Clause 21. The method of clause 20, wherein determining the threshold includes: accessing flight data for the historical flights that includes the geographic positions of the aircraft on the historical flights; determining a number of the historical flights for which the geographic positions changed from being obtained from the ADS-B position reports, to being estimated independent of the ADS-B position reports; and determining the threshold as the number of the historical flights, expressed as a percentage of a total number of the historical flights.

Clause 22. The method of any of clauses 15 to 21, wherein the data stream further includes corresponding geographic positions of the aircraft obtained from data sources distinct from the ADS-B position reports and the satellite navigation system, and the method further comprises: determining signal interference in the satellite navigation system based on a comparison of those of the geographic positions determined using the satellite navigation system, and the corresponding geographic positions; and generating an interference notification that is output to alert users of the signal interference in the satellite navigation system.

Clause 23. The method of clause 22, wherein the signal interference is determined when the geographic positions differ from the corresponding geographic positions by more than a difference threshold.

Clause 24. The method of clause 22 or clause 23, wherein the corresponding geographic positions are obtained from the data sources at least some of which are located onboard the aircraft.

Clause 25. The method of clause 24, wherein the corresponding geographic positions are obtained from the data sources that include multiple ones of distance measuring equipment (DME), very high frequency omni-directional range (VOR), localizer (LOC), or inertial reference unit (IRU).

Clause 26. The method of any of clauses 22 to 25, wherein the corresponding geographic positions are obtained from the data sources at least some of which are located on ground.

Clause 27. The method of clause 26, wherein the corresponding geographic positions are obtained from the data sources that include multiple ones of multilateration (MLAT), wide area multilateration (WAM), primary radar, Mode S radar, FLARM, or Open Glider Network (OGN).

Clause 28. The method of any of clauses 22 to 27, wherein the corresponding geographic positions are obtained from the data sources at least some of which are located onboard the aircraft, and at least some of which are located on ground.

Clause 29. A computer-readable storage medium for supporting flight operations of aircraft, the computer-readable storage medium being non-transitory and having computer-readable program code stored therein that, in response to execution by processing circuitry, causes an apparatus to at least: access a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system; track the geographic positions of the aircraft to determine a number of the respective flights for which the geographic positions change from being obtained from the ADS-B position reports, to being estimated independent of the ADS-B position reports; determine an outage in which the satellite navigation system is unavailable to the aircraft, based on the number of the respective flights for which the geographic positions change from the ADS-B position reports to estimated independent of the ADS-B position reports, and based on a threshold; and generate an outage notification that is output to alert users of the outage.

Clause 30. The computer-readable storage medium of clause 29, wherein the flights of the aircraft are in an airspace that is divided into geographic areas, and wherein the outage is determined for a geographic area of the geographic areas based on those of the geographic positions within the geographic area that change from being obtained from the ADS-B position reports, to being estimated independent of the ADS-B position reports.

Clause 31. The computer-readable storage medium of clause 30, wherein the outage is determined for multiple of the geographic areas based on those of the geographic positions within respective ones of the multiple geographic areas that change from being obtained from the ADS-B position reports, to being estimated independent of the ADS-B position reports.

Clause 32. The computer-readable storage medium of any of clauses 29 to 31, wherein the threshold is expressed as a threshold percentage, and the outage is determined when the number of the respective flights, expressed as a percentage of a total number of the respective flights, exceeds the threshold percentage.

Clause 33. The computer-readable storage medium of any of clauses 29 to 32, wherein the data stream includes the geographic positions of the aircraft within a time interval, and the computer-readable storage medium has further computer-readable program code stored therein that, in response to execution by the processing circuitry, causes the apparatus to further determine the threshold for the time interval.

Clause 34. The computer-readable storage medium of clause 33, wherein the threshold is determined based on historical flights of aircraft for an earlier time interval during which the satellite navigation system was unavailable.

Clause 35. The computer-readable storage medium of clause 34, wherein the apparatus caused to determine the threshold includes the apparatus caused to: access flight data for the historical flights that includes the geographic positions of the aircraft on the historical flights; determine a number of the historical flights for which the geographic positions changed from being obtained from the ADS-B position reports, to being estimated independent of the ADS-B position reports; and determine the threshold as the number of the historical flights, expressed as a percentage of a total number of the historical flights.

Clause 36. The computer-readable storage medium of any of clauses 29 to 35, wherein the data stream further includes corresponding geographic positions of the aircraft obtained from data sources distinct from the ADS-B position reports and the satellite navigation system, and the computer-readable storage medium has further computer-readable program code stored therein that, in response to execution by the processing circuitry, causes the apparatus to further at least: determine signal interference in the satellite navigation system based on a comparison of those of the geographic positions determined using the satellite navigation system, and the corresponding geographic positions; and generate an interference notification that is output to alert users of the signal interference in the satellite navigation system.

Clause 37. The computer-readable storage medium of clause 36, wherein the signal interference is determined when the geographic positions differ from the corresponding geographic positions by more than a difference threshold.

Clause 38. The computer-readable storage medium of clause 36 or clause 37, wherein the corresponding geographic positions are obtained from the data sources at least some of which are located onboard the aircraft.

Clause 39. The computer-readable storage medium of clause 38, wherein the corresponding geographic positions are obtained from the data sources that include multiple ones of distance measuring equipment (DME), very high frequency omni-directional range (VOR), localizer (LOC), or inertial reference unit (IRU).

Clause 40. The computer-readable storage medium of any of clauses 36 to 39, wherein the corresponding geographic positions are obtained from the data sources at least some of which are located on ground.

Clause 41. The computer-readable storage medium of clause 40, wherein the corresponding geographic positions are obtained from the data sources that include multiple ones of multilateration (MLAT), wide area multilateration (WAM), primary radar, Mode S radar, FLARM, or Open Glider Network (OGN).

Clause 42. The computer-readable storage medium of any of clauses 36 to 41, wherein the corresponding geographic positions are obtained from the data sources at least some of which are located onboard the aircraft, and at least some of which are located on ground.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting flight operations of aircraft, the apparatus comprising:
    a memory configured to store computer-readable program code; and
    processing circuitry configured to access the memory, and execute the computer-readable program code to cause the apparatus to at least:
        access a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system;
        track the geographic positions of the aircraft to determine a number of the respective flights for which the geographic positions change from being obtained from the ADS-B position reports, to being estimated independent of the ADS-B position reports;
        determine an outage in which the satellite navigation system is unavailable to the aircraft, based on the number of the respective flights for which the geographic positions change from the ADS-B position reports to estimated independent of the ADS-B position reports, and based on a threshold;
        generate an outage notification that is output to alert users of the outage;
    wherein the respective flights of the aircraft are in an airspace that is divided into geographic areas; and
    wherein the outage is determined for a geographic area of the geographic areas along the respective flights based on those of the geographic positions of the aircraft within the geographic area that change from being obtained from the ADS-B position reports, to being estimated independent of the ADS-B position reports.

2. The apparatus of claim 1, wherein the outage is determined for multiple of the geographic areas based on those of the geographic positions within respective ones of the multiple geographic areas that change from being obtained from the ADS-B position reports, to being estimated independent of the ADS-B position reports.

3. The apparatus of claim 1, wherein the threshold is expressed as a threshold percentage, and the outage is determined when the number of the respective flights, expressed as a percentage of a total number of the respective flights, exceeds the threshold percentage.

4. The apparatus of claim 1, wherein the data stream includes the geographic positions of the aircraft within a time interval, and the processing circuitry is configured to execute the computer-readable program code to cause the apparatus to further determine the threshold for the time interval.

5. The apparatus of claim 4, wherein the threshold is determined based on historical flights of aircraft for an earlier time interval during which the satellite navigation system was unavailable.

6. The apparatus of claim 5, wherein the apparatus caused to determine the threshold includes the apparatus caused to:
    access flight data for the historical flights that includes the geographic positions of the aircraft on the historical flights;
    determine a number of the historical flights for which the geographic positions changed from being obtained from the ADS-B position reports, to being estimated independent of the ADS-B position reports; and
    determine the threshold as the number of the historical flights, expressed as a percentage of a total number of the historical flights.

7. The apparatus of claim 1, wherein the data stream further includes corresponding geographic positions of the aircraft obtained from data sources distinct from the ADS-B position reports and the satellite navigation system, and the processing circuitry is configured to execute the computer-readable program code to cause the apparatus to further at least:
    determine signal interference in the satellite navigation system based on a comparison of those of the geographic positions determined using the satellite navigation system, and the corresponding geographic positions; and
    generate an interference notification that is output to alert users of the signal interference in the satellite navigation system.

8. The apparatus of claim 7, wherein the signal interference is determined when the geographic positions differ from the corresponding geographic positions by more than a difference threshold.

9. The apparatus of claim 1 wherein respective geographic areas are visually marked to indicate different numbers of geographic positions within those ones of the geographic areas that change from being obtained from the ADS-B position reports, to being estimated independent of the ADS-B position reports.

10. A method of supporting flight operations of aircraft, the method comprising:
   accessing a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system;
   tracking the geographic positions of the aircraft to determine a number of the respective flights for which the geographic positions change from being obtained from the ADS-B position reports, to being estimated independent of the ADS-B position reports;
   determining an outage in which the satellite navigation system is unavailable to the aircraft, based on the number of the respective flights for which the geographic positions change from the ADS-B position reports to estimated independent of the ADS-B position reports, and based on a threshold;
   generating an outage notification that is output to alert users of the outage;
   wherein the respective flights of the aircraft are in an airspace that is divided into geographic areas; and
   wherein the outage is determined for a geographic area of the geographic areas of the respective flights based on those of the geographic positions of the aircraft within the geographic area that change from being obtained from the ADS-B position reports, to being estimated independent of the ADS-B position reports.

11. The method of claim 10, wherein the outage is determined for multiple of the geographic areas based on those of the geographic positions within respective ones of the multiple geographic areas that change from being obtained from the ADS-B position reports, to being estimated independent of the ADS-B position reports.

12. The method of claim 10, wherein the threshold is expressed as a threshold percentage, and the outage is determined when the number of the respective flights, expressed as a percentage of a total number of the respective flights, exceeds the threshold percentage.

13. The method of claim 10, wherein the data stream includes the geographic positions of the aircraft within a time interval, and the method further comprises determining the threshold for the time interval.

14. The method of claim 13, wherein the threshold is determined based on historical flights of aircraft for an earlier time interval during which the satellite navigation system was unavailable.

15. The method of claim 14, wherein determining the threshold includes:
   accessing flight data for the historical flights that includes the geographic positions of the aircraft on the historical flights;
   determining a number of the historical flights for which the geographic positions changed from being obtained from the ADS-B position reports, to being estimated independent of the ADS-B position reports; and
   determining the threshold as the number of the historical flights, expressed as a percentage of a total number of the historical flights.

16. The method of claim 10, wherein the data stream further includes corresponding geographic positions of the aircraft obtained from data sources distinct from the ADS-B position reports and the satellite navigation system, and the method further comprises:
   determining signal interference in the satellite navigation system based on a comparison of those of the geographic positions determined using the satellite navigation system, and the corresponding geographic positions; and
   generating an interference notification that is output to alert users of the signal interference in the satellite navigation system.

17. The method of claim 16, wherein the signal interference is determined when the geographic positions differ from the corresponding geographic positions by more than a difference threshold.

18. A computer-readable storage medium for supporting flight operations of aircraft, the computer-readable storage medium being non-transitory and having computer-readable program code stored therein that, in response to execution by processing circuitry, causes an apparatus to at least:
   access a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system, wherein the respective flights of the aircraft are in an airspace that is divided into geographic areas;
   track the geographic positions of the aircraft to determine a number of the respective flights for which the geographic positions change from being obtained from the ADS-B position reports, to being estimated independent of the ADS-B position reports;
   determine an outage in which the satellite navigation system is unavailable to the aircraft, based on the number of the respective flights for which the geographic positions change from the ADS-B position reports to estimated independent of the ADS-B position reports, and based on a threshold;
   generate an outage notification that is output to alert users of the outage; and
   wherein the outage is determined for a geographic area of the geographic areas along the respective flights based on those of the geographic positions of the aircraft within the geographic area that change from being obtained from the ADS-B position reports, to being estimated independent of the ADS-B position reports.

19. The computer-readable storage medium of claim 18, wherein the data stream further includes corresponding geographic positions of the aircraft obtained from data sources distinct from the ADS-B position reports and the satellite navigation system, and the computer-readable storage medium has further computer-readable program code stored therein that, in response to execution by the processing circuitry, causes the apparatus to further at least:
   determine signal interference in the satellite navigation system based on a comparison of those of the geographic positions determined using the satellite navigation system, and the corresponding geographic positions; and
   generate an interference notification that is output to alert users of the signal interference in the satellite navigation system.

20. An apparatus for supporting flight operations of aircraft, the apparatus comprising:

a memory configured to store computer-readable program code; and processing circuitry configured to access the memory, and execute the computer-readable program code to cause the apparatus to at least:

access a data stream of geographic positions of aircraft on respective flights, the geographic positions obtained from automatic dependent surveillance broadcast (ADS-B) position reports, or estimated independent of the ADS-B position reports, those of the geographic positions obtained from the ADS-B position reports determined using a satellite navigation system;

track the geographic positions of the aircraft to determine a number of the respective flights for which the geographic positions change from being obtained from the ADS-B position reports, to being estimated independent of the ADS-B position reports;

determine an outage in which the satellite navigation system is unavailable to the aircraft, based on the number of the respective flights for which the geographic positions change from the ADS-B position reports to estimated independent of the ADS-B position reports, and based on a threshold;

generate an outage notification that is output to alert users of the outage; and wherein the threshold is expressed as a threshold percentage, and the outage is determined when the number of the respective flights, expressed as a percentage of a total number of the respective flights, exceeds the threshold percentage.

* * * * *